Aug. 13, 1940.  N. P. DARASH  2,211,596
TOOL HOLDER
Filed March 26, 1938
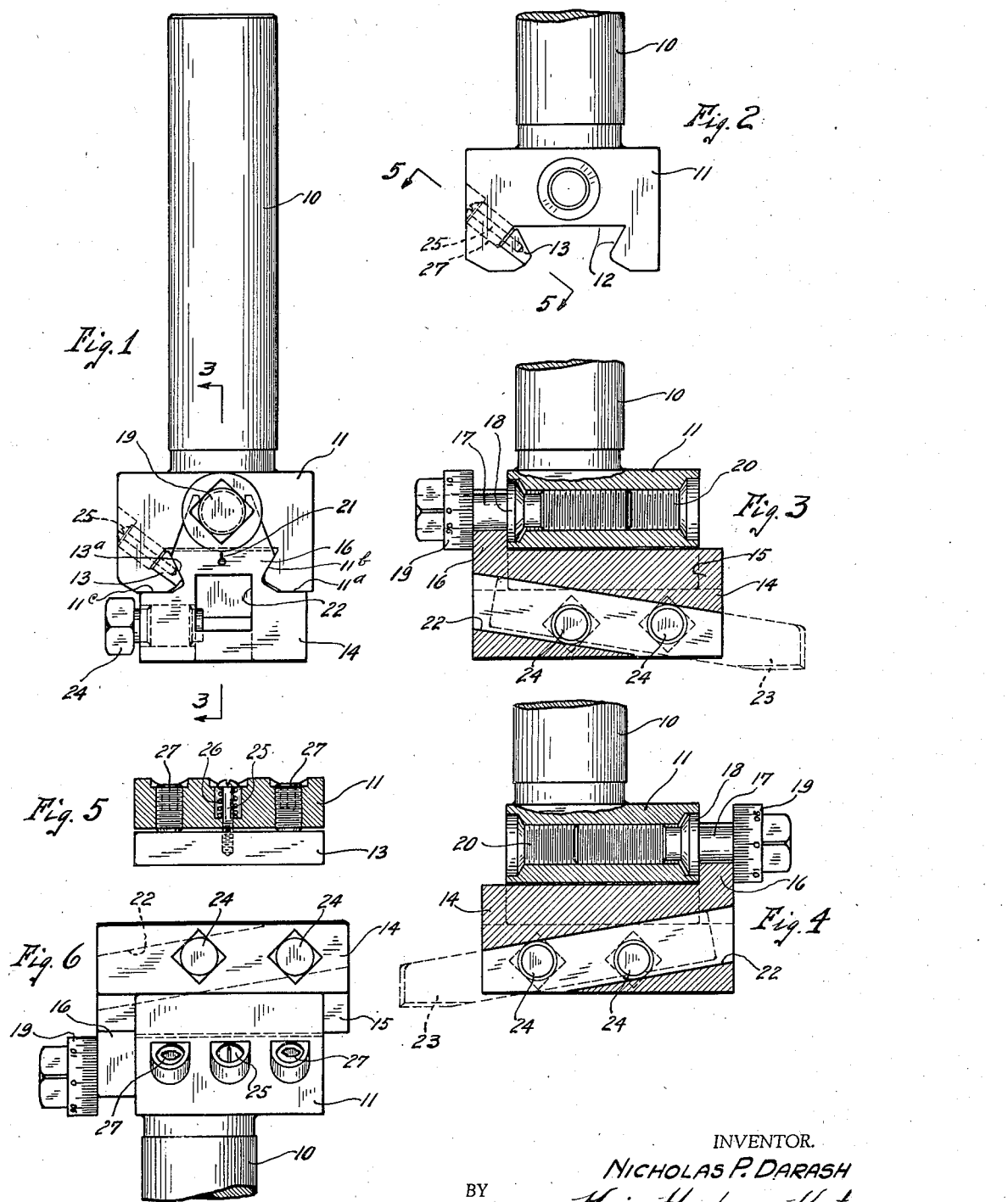
INVENTOR.
NICHOLAS P. DARASH
BY
ATTORNEYS Patented Aug. 13, 1940

2,211,596

UNITED STATES PATENT OFFICE 2,211,596

TOOL HOLDER

Nicholas P. Darash, Cleveland, Ohio, assignor to The Warner & Swasey Company, Cleveland, Ohio, a corporation of Ohio Application March 26, 1938, Serial No. 198,282

5 Claims. (Cl. 29—99)

This invention relates to an improved tool holder for lathes and other machine tools.

An object of the invention is to provide an improved tool holder of the character specified, which is so constructed that when the adjustable tool carrying portion thereof is clamped in adjusted position it possesses extreme rigidity and strength, thus enabling the holder to have full capacity for assuming the thrust of the cutting tool without deflection due to any springing action or relative movement of the parts.

Another object is to provide in an improved tool holder an adjustable gib forming a portion of the guideway for the tool carrying slide and which gib is so mounted that it will remain in position in the guideway when the slide is removed therefrom and can be adjusted relative to the slide so as to cause the guideway to have the correct dimensions to impart stability to the slide but allow for its adjusting movement in the guideway.

A further object is to provide a gib for the guideway for the adjustable slide of a tool holder and which is so mounted in the tool holder that it can be adjusted to function as a gib for the slide or as a clamp for the slide to hold the latter rigidly in its adjusted position.

Another object is to provide a tool holder wherein the body is offset with respect to the shank and also wherein the adjustable tool carrying slide and the means for adjusting said slide can be reversibly positioned with respect to the body to thus position the cutting edge of the tool at various distances from the longitudinal center line of the shank of the holder.

Further and additional objects and advantages not hereinbefore specified will become apparent hereinafter during the following detailed description of an embodiment of the invention.

Referring to the accompanying drawing illustrating such embodiment of the invention, Fig. 1 is a plan view of the improved tool holder.

Fig. 2 is a fragmentary plan view of the tool holder with the adjustable tool carrying slide and adjusting screw removed from the body.

Fig. 3 is a fragmentary sectional view of the tool holder as shown in Fig. 1, and is taken substantially on line 3—3 of Fig. 1 looking in the direction of the arrows.

Fig. 4 is a view similar to Fig. 3 but showing the tool carrying slide and the adjusting means therefor in the reverse position.

Fig. 5 is a sectional view through the body showing the adjustable gib or clamp in elevation and is taken substantially on line 5—5 of Fig. 2 looking in the direction of the arrows, and Fig. 6 is a fragmentary side elevation of the tool holder shown in Fig. 1 and is taken looking from the left hand side of said figure.

The improved tool holder comprises a shank 10 by means of which the holder is mounted in a suitable part of the machine tool, such as a turret or another tool holder applied to a turret or in any other desired part or attachment of the machine tool. A body 11 is located at one end of the shank 10 and preferably is formed integral therewith and reference to Figs. 3 and 4 will show that said body 11 is offset with respect to the longitudinal center line of the shank for a purpose later to be made clear. The body 11 is provided with a transversely extending recess 12 which is so shaped as to form with an adjustable wedge-shaped gib or clamp 13 a dove-tail guideway for the adjustable tool carrying slide 14 that is provided with a dove-tail portion 15 slidably mounted in the recess 12. At one end of the slide 14 the dove-tail portion 15 has a portion 16 extending at right angles thereto and provided at its free end with a fork adapted to straddle the body portion of an adjusting screw 17 and lying intermediate an integral flange 18 formed on said screw and a micrometer head 19 at the outer end of the screw, as clearly indicated in Fig. 3. The screw 17 is threaded into an opening 20 formed in the body 11 and the integral flange 18 projects into a complementary recess in the body at either end of the threaded opening 20 when the slide is in its most inward position.

It will be seen that when the screw 17 is turned inwardly or outwardly of the opening 20 the slide 14 will be moved in its guideway, due to the fork of the portion 16 lying between the flange 18 and the micrometer head 19, and consequently the slide 14 can be accurately adjusted or positioned as desired with respect to the body 11 by bringing the indicia of the micrometer head into line with a fixed pointer line 21 formed on the portion 16.

It will also be noted that the slide 14 and the adjusting screw 17 can be removed from the body and the slide and screw reversely positioned on the body as indicated in Fig. 4 and that the screw 17 in this new position of the slide extends into the threaded opening 20 in the body, while the flange 18 projects into the complementary recess in the other end of the opening when the slide is in its most inward position.

The slide 14 is provided with a tool receiving opening 22 that extends, in this instance, at an acute angle to the longitudinal center line of the shank and a tool, indicated at 23 by dash lines, can be clamped in said opening by suitable clamping screws 24. It will be understood that the tool 23 can be longitudinally adjusted to various positions in the opening 22.

It will also be noted that since the body 11 is offset with respect to the longitudinal center line of the shank 10 and the slide 14 can be reversed with respect to the body 11, the cutting edge of the tool has a range of adjustments at a greater distance from the longitudinal center line of the shank when the slide is positioned as shown in Fig. 3, than it has when the slide is positioned as shown in Fig. 4. This arrangement of offsetting the body with respect to the longitudinal center line of the shank and having the slide reversible on the body results in doubling the range of adjustability of the cutting edge of the tool with relation to the longitudinal center line of the shank, and, of course, with relation to the work piece to be machined.

As previously stated, a tapered or wedge-shaped gib or clamping member 13 forms one side of the dove-tail guideway 12 of the body member 11 and said gib 13 extends the full length of the body. The gib 13 is held in position in the guideway and against endwise movement therein by means of a screw 25 secured to the gib substantially midway of its ends and having its head portion located in a recess formed in the body member 11. A spring 26 surrounds the screw 25 intermediate its head and the bottom of the recess in the body and acts to hold the gib 13 under spring tension against the abutting ends of adjusting or clamping screws 27 which are arranged in threaded openings formed in the body 11 and located on opposite sides of the screw 25.

As previously stated, the gib 13 forms part of the dove-tail recess or guideway and when the tool carrying slide 14 is being adjusted by the screw 17 the adjusting screws 27 are so positioned that the gib 13 will be located correctly to allow the slide to move freely in the guideway and without any looseness. In other words, during the time that the slide 14 is being adjusted the gib 13 can be positioned by adjusting the screws 27 to form a perfect guideway for the slide, wherefore the cutting tool can be brought to the correct location, and then when the slide is clamped in position the location of the cutting edge of the tool will not be materially changed.

As soon as the slide and cutting tool have been correctly positioned by the rotation of the screw 17 the screws 27 are then turned to force the wedge-shaped gib or clamping member 13 inwardly of the guideway or recess 12, with the result that the slide 14 and the portion 15 thereof are held tightly against the body member with a metal to metal surface contact.

It will be seen that the wedging action of the gib 13 when placed in clamping position by the screws 27 causes the slide 14 and the portion 15 thereof to tightly engage the body member 11 at 11a, 11b and 11c and said portion 15 of the slide also tightly engages the gib 13 at 13a (see Fig. 1). Due to the four point contact of the slide with the body, as just explained, the slide, when clamped, in effect becomes a rigid structure with the body 11, thus insuring ample stability and steadiness to the tool. It will also be noted that the body 11 is of rugged construction and will resist any spring of the metal when the slide is clamped therein. In the construction above described it will be seen that adjacent portions of the body 11 and the slide 14 form a convergent or V-shaped space in which the gib 13 is located. It will also be seen that the gib itself is of substantially triangular cross-sectional shape and that the wedge faces corresponding with two sides of the triangle cooperate with the convergent faces of the V-space. The face of the gib corresponding with the third side or base of the triangle is disposed so that the clamping screws 27 may act thereon, within the angle included by the wedge faces, to produce the desired wedging action.

It will be noted further that when the slide 14 and the adjusting screw 17 are removed to vary the position of the slide and screw with respect to the body 11, the gib 13 does not fall out but remains in position due to the screw 25 and the spring 26 acting thereon holds the gib against the screws 27. The screw 25 also holds the gib 13 in proper position longitudinally of the guideway. Consequently when the slide is again mounted on the body in its new position the gib 13 has remained in its correct position to enable the slide to have a free but steady sliding movement in the guideway or recess so that the cutting tool can be readily and accurately positioned in its new location.

It will also be recalled that since the body 11 is offset with respect to the longitudinal center line of the shank 10, a large range of adjusted positions of the cutting edge of the tool in relation to the longitudinal center line of the shank or to a work piece can be obtained by inverting the slide from one position to the other as shown in Figs. 3 and 4.

Although a preferred embodiment of the invention has been illustrated and described herein, it will be understood that the invention is susceptible of various modifications and adaptations within the scope of the appended claims.

Having thus described my invention I claim:

1. A tool holder comprising a shank, a body at one end of the shank and offset with respect to the axis thereof, a slide mounted on said body and provided with an opening arranged at an acute angle to the axis of said shank and adapted to receive a cutting tool, and a screw for adjusting said slide, said body being provided with a threaded opening to receive said screw from either end thereof whereby said slide can be reversibly positioned on said body and said screw can effect an adjustment thereof in either of said positions.

2. A tool holder comprising a shank, a body at one end of said shank and offset with respect to the axis thereof and provided with a guideway, a slide mounted in said guideway, a wedge-shaped gib in said guideway, means securing said gib to said body under spring tension, means for moving said gib against said spring tension to wedge said slide in said guideway, and an adjusting screw for said slide, said body being provided with a threaded opening for receiving said screw from either end thereof whereby said slide can be reversibly mounted in said guideway and adjusted therein by said screw.

3. A tool holder comprising a body provided with a guideway, a member slidable in said guideway, adjacent portions of said body and member defining a V-like recess, a gib of substantially triangular cross-section in said recess and having wedge faces changeable with the sides of the V-recess and a third face corresponding with the base of the triangular cross-section, and means adapted to cooperate with said third face of the gib for moving the same to cause a wedging action for clamping said member and body together.

4. A tool holder comprising a body provided with a guideway, a member slidable in said guideway, adjacent portions of said body and member defining a V-like recess, a gib of substantially triangular cross-section in said recess and having wedge faces engageable with the sides of the V-recess and a third face corresponding with the base of the triangular cross-section, means adapted to cooperate with said third face of the gib for moving the same to cause a wedging action for clamping said member and body together, a screw holding the gib against longitudinal movement in said recess, and a spring acting on the screw to urge the gib toward a non-wedging position.

5. A tool holder comprising a body provided with a guideway, a member slidable in said guideway, adjacent portions of said body and member defining a V-like recess, a gib of substantially triangular cross-section in said recess and having wedge faces engageable with the sides of the V-recess and a third face corresponding with the base of the triangular cross-section, a pair of screws on said body engageable with said third face of the gib at longitudinally spaced points for moving the gib in a wedging direction to clamp said member and body together, and spring tension means acting on the gib between said screws for moving the gib in a non-wedging direction and holding the same in engagement with said screws.

NICHOLAS P. DARASH.

CERTIFICATE OF CORRECTION.

Patent No. 2,211,596.  August 13, 1940.

NICHOLAS P. DARASH.

It is hereby certified that error appears in the printed specification of the above numbered patent requiring correction as follows: Page 2, second column, line 72, claim 3, for the word "changeable" read --engageable--; and that the said Letters Patent should be read with this correction therein that the same may conform to the record of the case in the Patent Office.

Signed and sealed this 17th day of September, A. D. 1940.

Henry Van Arsdale,
Acting Commissioner of Patents.

(Seal)